No. 618,607. Patented Jan. 31, 1899.
W. F. MURRAY.
ADJUSTABLE FAIR LEADER.
(Application filed Aug. 17, 1898.)
(No Model.)
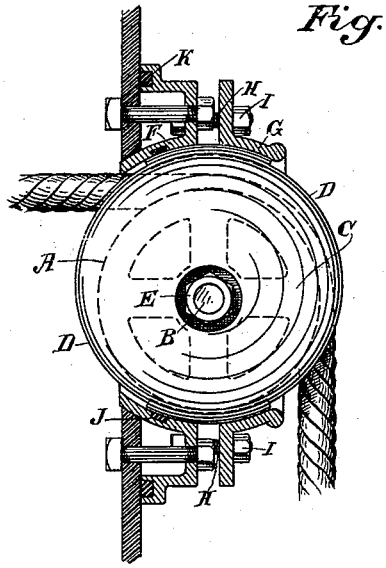
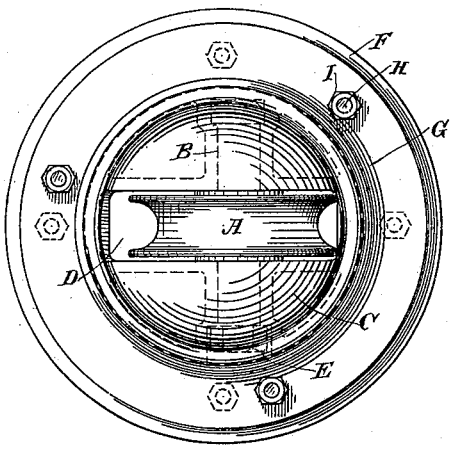
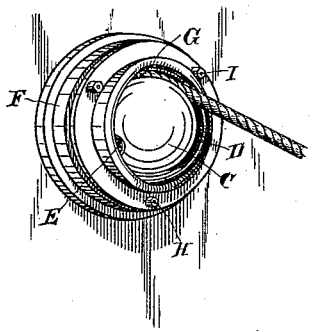
Witnesses,
Inventor
William F. Murray
By Dewey Strong & Co.
atty

UNITED STATES PATENT OFFICE.

WILLIAM F. MURRAY, OF SAN FRANCISCO, CALIFORNIA.

ADJUSTABLE FAIR-LEADER.

SPECIFICATION forming part of Letters Patent No. 618,607, dated January 31, 1899.

Application filed August 17, 1898. Serial No. 688,824. (No model.)

*To all whom it may concern:*

Be it known that I, WILLIAM F. MURRAY, a citizen of the United States, residing in the city and county of San Francisco, State of California, have invented an Improvement in Adjustable Fair-Leaders; and I hereby declare the following to be a full, clear, and exact description of the same.

This invention relates to a device which I call an "adjustable fair-leader." It is designed for the purpose of changing the direction of ropes, through which power is applied for hoisting and other purposes, so that they may be made to lead in any direction from the point of change and to always retain the directing-pulley fairly or in a direct line in both directions therefrom.

It consists in the parts and the constructions and combinations of parts hereinafter described and claimed.

Figure 1 is a vertical section through the sockets, showing the attachment of my device. Fig. 2 is a face view of the same. Fig. 3 shows its application.

A is the pulley, made of any suitable or desired material having the proper metalline or other bushing, and B is the pin or shaft upon which the pulley is mounted.

C is a globular-shaped support having a groove or channel made in one side, as shown at D, of sufficient length and width to allow the pulley to be introduced and turn freely. Transversely through the globe is made an opening adapted to receive the pin B. The opening is suitably countersunk at each end, and the head of the pin fits into one of these openings, while the nut E screws upon the other end of the pin and is correspondingly sunk below the surface of the globe, so as to leave the latter free to turn in any direction within its socket.

The socket is composed of two segments F and G. The lower segment is fixed at any suitable point with relation to the power apparatus and the direction in which the rope is to be led. For instance, upon shipboard the donkey-engine may be contained in a house on deck and the rope leading from the winding-drum passes out through the side of the house. At the point where the rope leaves the house my device will be fixed, the segment F being fixed to the side of the house and the segment G being adjustably secured to the segment F by means of bolts H with suitable nuts I.

The two segments F and G partially inclose the central portion of the globe C, and when the nuts are slackened this globe may be turned freely within the segments, so that the line of direction of the pulley A may be changed to allow the rope to lead therefrom to any desired point, the periphery of the pulley being approximately in line with the drum or power apparatus, whatever change may be made in its angle of direction by which the rope leaves the pulley upon the other side. Whenever the pulley has been set to the desired direction, by turning the globe the nuts may be tightened, thus clamping the segments F and G firmly against the periphery of the globe and locking it in place, and the globe may thus always be adjusted to any changes of direction of the rope which may occur or be desired.

To prevent water from entering when exposed, a packing ring or gasket J is fitted into an annular channel in the socket, so as to make a tight joint against the globe, and a similar packing at K makes a joint against the deck house or support.

Having thus described my invention, what I claim as new, and desire to secure by Letters Patent, is—

1. In a fair-leader, a pulley, a globe having an opening for the pulley, and a pin passing through the globe and forming an axis for said pulley, in combination with a two-part socket partially inclosing the globe and having the periphery of the latter fitted within the same, and means whereby the parts of the socket are adjusted with relation to each other to clamp the periphery of the globe and thereby fix the position of the pulley.

2. In a fair-leader, a pulley, a globe having a slot formed therein within which the pulley is freely turnable, a hole made through the globe at right angles with the slot and having countersunk openings at opposite ends, a pin upon which the pulley is turnable having a head at one end and a securing-nut at the other fitting in the countersunk openings below the peripheral surface of the globe, and adjustable segments inclosing the central portion of the periphery of the globe, within which segments the globe is turnable and adjustable.

In witness whereof I have hereunto set my hand.

WILLIAM F. MURRAY.

Witnesses:
S. H. NOURSE,
JESSIE C. BRODIE.